US009032410B1

(12) United States Patent
Kumpera et al.

(10) Patent No.: US 9,032,410 B1
(45) Date of Patent: May 12, 2015

(54) NON-PRECISE GARBAGE COLLECTION IN NON-COOPERATIVE SYSTEMS

(71) Applicant: Xamarin Inc., San Francisco, CA (US)

(72) Inventors: Rodrigo Kumpera, Boston, MA (US); Miguel de Icaza, Boston, MA (US)

(73) Assignee: Xamarin Inc., San Francisco, CA (US)

( * ) Notice: Subject to any disclaimer, the term of this patent is extended or adjusted under 35 U.S.C. 154(b) by 0 days.

(21) Appl. No.: 14/463,440

(22) Filed: Aug. 19, 2014

(51) Int. Cl.
*G06F 12/00* (2006.01)
*G06F 12/02* (2006.01)
*G06F 9/48* (2006.01)

(52) U.S. Cl.
CPC ............ *G06F 12/0261* (2013.01); *G06F 9/485* (2013.01); *G06F 2212/702* (2013.01); *G06F 12/0253* (2013.01)

(58) Field of Classification Search
CPC .. G06F 12/0261; G06F 9/485; G06F 212/702
See application file for complete search history.

(56) References Cited

U.S. PATENT DOCUMENTS

| | | | | |
|---|---|---|---|---|
| 6,625,808 | B1 * | 9/2003 | Tarditi | 717/154 |
| 6,654,773 | B2 * | 11/2003 | Hills | 1/1 |
| 6,996,814 | B2 * | 2/2006 | Bak | 717/148 |
| 7,080,374 | B2 * | 7/2006 | Dahlstedt et al. | 718/1 |
| 7,089,273 | B2 * | 8/2006 | Wu et al. | 1/1 |
| 7,350,197 | B2 * | 3/2008 | Savov | 717/137 |
| 7,827,358 | B2 * | 11/2010 | Watson et al. | 711/135 |
| 8,074,025 | B2 * | 12/2011 | Wang et al. | 711/117 |
| 8,095,513 | B2 * | 1/2012 | Grunkemeyer et al. | 707/687 |
| 2007/0240157 | A1 * | 10/2007 | Herenyi et al. | 718/1 |

OTHER PUBLICATIONS

Cheng et al. "A Parallel, Real-Time Garbage Collector", 2001 ACM, pp. 125-136.*
"Memory Management in the Java HotSpot Virtual Machine", Sun Microsystems, Inc., Apr. 2006. pp. 1-21.*
Agesen. Ole, "GC Points in a Threaded Environment," Palo Alto, CA, Sun Microsystems, Dec. 1998, 23 pages.
White, Derek et al., "The GC Interface in the EVM1." Palo Alto, CA, Sun Microsystems, Dec. 1998, 51 pages.

* cited by examiner

*Primary Examiner* — Van Nguyen
(74) *Attorney, Agent, or Firm* — John W. Branch; Lowe Graham Jones PLLC

(57) ABSTRACT

Embodiments are directed towards garbage collection for an application running on a non-cooperative target platform. Where the garbage collection optimistically manages thread state for transitions to and from native and managed code and that some threads are suspended while others are left executing during garbage collection. When a characteristic of the native code call indicates that a duration of the native code call may exceed a defined duration, state information for the thread may be updated to transition the thread to the unmanaged code environment. When a garbage collection event occurs, thread state information is updated to communicate suspend requests to the threads. Then the runtime may wait for each thread in the managed code environment to be reach a safe state before garbage collection may commence.

30 Claims, 11 Drawing Sheets

NON-PRECISE GARBAGE COLLECTION IN NON-COOPERATIVE SYSTEMS

TECHNICAL FIELD

This invention relates generally to software application development, and more particularly, but not exclusively, to non-precise memory garbage collection in non-cooperative systems.

BACKGROUND

A highly competitive application marketplace and the consumerization of information technology have put tremendous pressure on application developers to deliver high quality user experiences for both consumers and employees on numerous and varied target platforms. Accordingly, it may be advantageous to employ modern cross-platform software development tools to enable application developers to develop applications. Further, modern programming languages may include features that allow for efficient and safer programming of applications. Some of the modern programming languages may employ one or more runtime garbage collection features for applications that are executing on the target platform. However, for security reasons, some platforms, namely, some mobile computers (e.g., smartphones, tablets, or the like), game consoles, and so on, may have features that may interfere with garbage collection. Thus, it is with respect to these and other considerations that these innovations are made.

BRIEF DESCRIPTION OF DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF THE VARIOUS EMBODIMENTS

Figure 1:
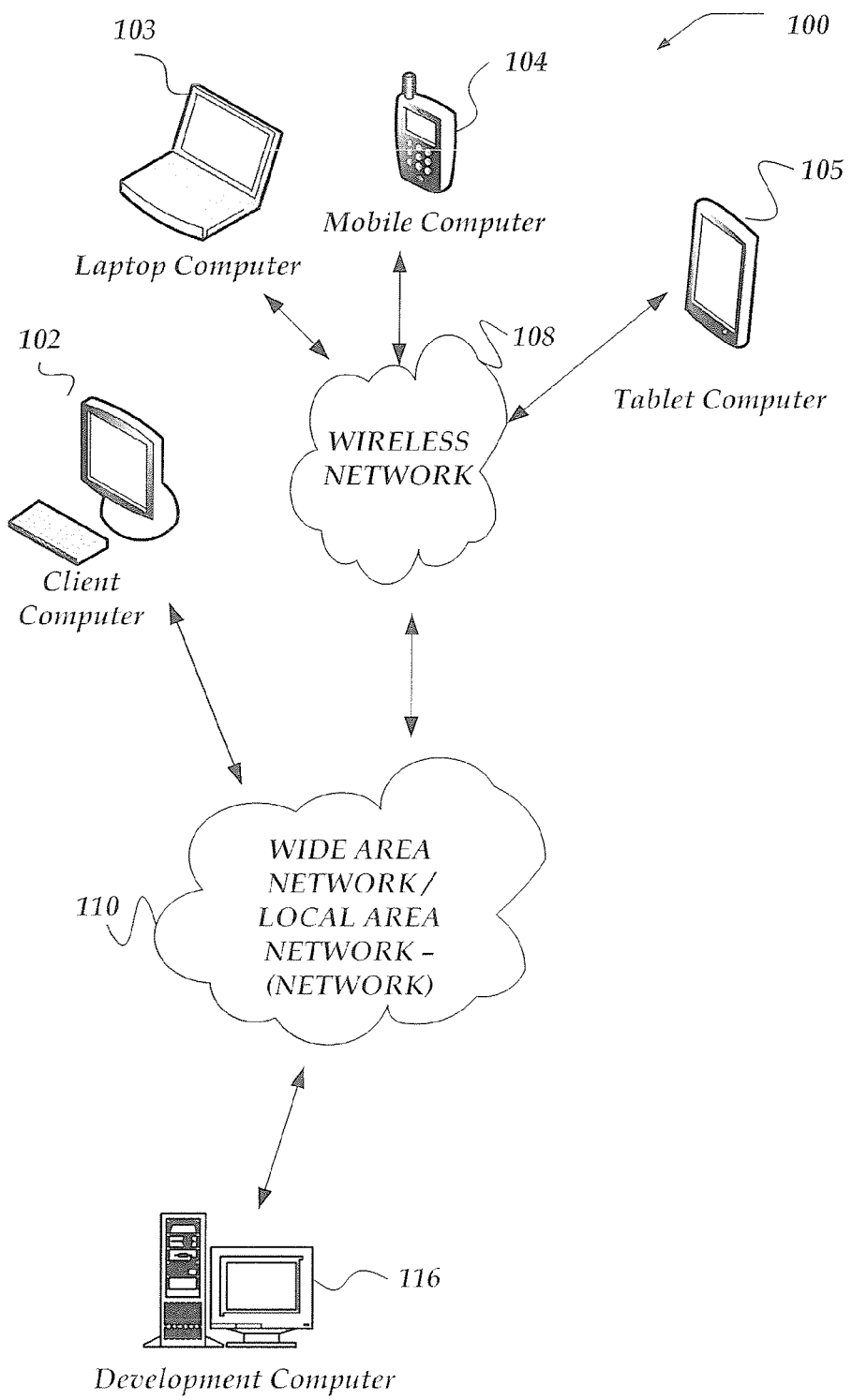
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and the include plural references. The meaning of "in" includes "in" and "on."

The term "application" as used herein refers to a computing/software application designed to operate on one of more target computers/platforms. One of ordinary skill in art the will appreciate that many type of applications may benefit from these innovations and are within the scope and spirit of the disclosed innovations, including, but not limited to, web applications, web pages, desktop applications, video games, mobile applications, media players, office applications, utilities, or the like.

The term "application developer" as used herein refers to users that design and develop applications. Application developers may create and deploy applications to for use on various target platforms.

The term "mobile computer" as used herein refers to client computers and may include tablet computers, handheld computers, wearable computers, desktop computers, or the like.

Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, game consoles, integrated devices combining at least one of the preceding computers, or the like.

The terms "target platform," "target computer" as used herein refer to computers, such as, mobile computers, client computers, smart televisions, game consoles, set-top cable boxes (for televisions), smart home appliances, or the like, upon which applications are intended to be deployed. In at least one of the various embodiments, source code for an application may be compiled into machine code that is compatible for execution on one or more target computers. Different types of target computers may require compilers to generate machine code that is particular to the machine architecture of the particular target computers.

The term "non-cooperative system" as used herein refers to one or more target platforms that disable a runtime managed code environment from accessing sufficient information about threads executing in native/unmanaged environments to enable garbage collection to be safely and reliably performed. For example, a target platform's facilities for halting or suspending threads outside of a managed code environment may be disabled or otherwise unavailable for use by a runtime environment.

The term "runtime environment" as used herein may refers applications/facilities that provide the executable environment that enable one or more applications to run on a target platform. In some embodiments, a runtime environment may comprise a virtual machine and one or more supporting libraries and/or subsystems. Also, runtime environments may be arranged to support more than one computer programming language. Examples, may include, Java Runtime Environment (JRE), Microsoft's, Common Language Runtime (CLR), or the like.

The term "managed code environment," or "managed runtime environment" as used herein refers to a runtime environment or a portion of a runtime environment where the runtime environment has control and visibility of the memory, threads, of execution, resources or the like.

The term "unmanaged code environment." "unmanaged runtime environment," and "native code environment" as used herein refer to execution environments on the target platform where the managed runtime does not have as much control or visibility as it does within managed code environments. In some cases, unmanaged environments may be considered to be outside of the control of the managed runtime. Typically, unmanaged code environments are encountered if threads executing in a managed environment call or access native services or facilities on the target platform that are outside of the managed runtime, such as, networking services, file systems, system libraries, or the like, or combination thereof.

The term "native code call" as used herein refers to a function call that will be executed in the unmanaged code environment. In at least one of the various embodiments, a compiler may be insert native code calls into an application if the application needs to access various native services or facilities provided by the target platform. For example, native code calls may include, file system access, network operations, interprocess communication, date/time functions, math functions, string processing functions, synchronization operations (e.g., locks, semaphores, mutexes, and so on), user interface functions, or the like.

The term "managed thread" as used herein refers to a thread of execution operating within and managed by a managed runtime environment.

The term "unmanaged thread" as used herein refers to a thread of execution operating on the target platform outside of the control of the managed runtime environment. In at least one of the various embodiments, managed threads may transition from the managed code environment to an unmanaged code environment if they execute native code calls.

The term "garbage collection" as used herein refers to one or more methods for automatic runtime memory management. Garbage collection tasks may include freeing or deleting memory that is no longer being used, de-fragmenting one or more memory pools used by the runtime environment, compacting the memory used by the runtime environment, or the like, or combination thereof. In most cases, garbage collection frees application developer from having to use error prone manual memory management for their applications. One of ordinary skill in the art will appreciate that there are many well-known ways for implementing garbage collection for runtime environments. Garbage collection schemes entail tracking the memory objects that are currently being used so any unused memory object may be discarded and/or freed. Further, in some cases, garbage collection also entails defragmenting or otherwise optimizing the memory pools used for allocating memory to memory objects. A garbage collector may be a facility provided by the runtime environment for performing garbage collection for the runtime environment.

In at least one of the various embodiments, garbage collectors may be arranged to receive inputs that are called garbage collection roots (GC Roots). GC Roots may be traced for determining the status of the memory objects used by the system. The GC Roots may be the references to a memory object graph from which the relevant memory objects may be determined and referenced.

In at least one of the various embodiments, a garbage collection root may be precise or conservative. A precise GC root is one where its value must only be a reference (a pointer) to a managed object. A conservative GC Root may be one where the type of its value is unknown and can either be a reference to a managed object or a scalar value such as a number. Accordingly, the garbage collector may consider it as a potential reference to a managed object, but is not able to change the value of the reference. A thread may be associated with a set of garbage collection data that includes the set of GC roots for its memory object. During garbage collection each thread's GC roots may be provided to the garbage collector as input. In at least one of the various embodiments, garbage collection may be a resource intensive/time consuming operation so garbage collectors are often arranged to perform garbage collection only when needed. Accordingly, a managed runtime may be arranged to monitor the current memory usage/availability of memory and trigger garbage collection if a memory threshold may be exceeded. Likewise, a managed runtime may be arranged to monitor its computing performance utilization to initiate garbage collection when the runtime is idle and/or underutilized.

In at least one of the various embodiments, a garbage collector may be arranged to communicate with one or more running threads to indicate that it is time to perform garbage collections. Accordingly, in at least one of the various embodiments, the threads ma suspend themselves or otherwise enter a stable state to enable the garbage collector to perform its duties unimpeded.

The term "non-precise garbage collector" as used herein refers to a garbage collector that is arranged to receive inputs that include conservative garbage collection roots.

The term "garbage collection data (GC data)" as used herein refers to information associated with a thread that may be used by a garbage collector for performing garbage collection action on the memory object that are referenced by the thread. Accordingly, if a thread GC data is saved and known to be stable the garbage collector may perform garbage collection actions that include the memory object referenced by the thread. GC data include that various well-known bookkeeping information that may be used for conservative garbage collection.

The term "thread state information" as used herein refers to state information for threads known to a managed runtime. The thread state information may be tracked individually for each thread. The managed runtime may update the thread state information depending on the various conditions described below.

In at least one of the various embodiments, threads for managed applications are responsible for polling their state information to determine if they need to take action based on the current state. The thread state information may be maintained for each thread to accommodate for the runtime being disabled from communicating directly with the threads. Accordingly, the thread information is employed as a method for communication between the runtime and the threads.

The terms "machine code," "machine code fragment," and "machine code instructions" as used herein refer to symbols representing instructions that have been generated by compiling source code. Machine code comprises low level instructions designed for execution by a CPU complex of a target computer. Further, machine code may be instructions that may be executed directly on a target computer without alteration. Also, the data employed by an application may be included with the machine code. In some cases, a compiler and/or other application development program may supply or generate machine code that is not directly compiled from the source code.

The term "parameter" as used herein refers to a variable and/or variable name that is included either explicitly or implicitly in the definition of a function. The precise syntax of parameters will vary depending on the particular programming language that is being employed. In at least one of the various embodiments, the parameters defined for a function may be employed by a compiler to generate an identifier and/or signature for the particular function. Accordingly, in some programming languages, function having the same name may be distinguishable because they are defined using different parameters.

The term "return value" as used herein refers to a variable that is passed out of function (e.g., returned) after it runs to completion. Note, depending on the programming language, return values for functions may be optional.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards for managing memory for an application executing in a managed runtime. In at least one of the various embodiments, if during the execution of the application in a managed code environment, a thread of the application encounters a native code call the managed runtime may determine one or more characteristics about the native code call based in part on configuration information that may be associated with the target platform when the application executing.

In at least one of the various embodiments, when a characteristic of the native code call indicates that a duration of the native code call may exceed a defined duration threshold, thread state information for the thread may be updated to indicate that the thread may be executing in an unmanaged code environment. And, in at least one of the various embodiments, when the native code call completes, the thread state information for the thread may be updated to indicate that the thread may be executing in the managed code environment.

In at least one of the various embodiments, when a garbage collection event occurs, thread state information for each thread may be updated to communicate a suspend request to the plurality of threads. In at least one of the various embodiments, then the managed runtime may wait for each thread that may be executing in the managed code environment to become safe for garbage collection. And, in at least one of the various embodiments, when each thread in the managed code environment is safe or garbage collection, one or more garbage collection actions may be executed to manage the memory for one or more of the application, the managed runtime, or the managed code environment.

In at least one of the various embodiments, when a characteristic of the native code call indicates that a duration of the native code call may be less than a defined duration, the encountered native code call may be executed without modifying the thread state information for the thread.

In at least one of the various embodiments, when a characteristic of the native code call indicates that the native code call reads or writes one or more managed memory objects, thread state information and garbage collection data for the thread may be updated when the execution time of the native code call exceeds a defined duration.

In at least one of the various embodiments, waiting for each thread to become safe for garbage collection may further include, examining and/or polling the thread state information for each thread to determine if the threads are safe garbage collection.

In at least one of the various embodiments, determining a characteristic of the native code call may further include, executing machine code that has been automatically inserted into the application by a compiler such that the machine code enables the characteristics of the native code call to be determined at runtime.

In at least one of the various embodiments, executing one or more garbage collection actions may further include freeing memory objects that are no longer in use, de-fragmenting one or more memory pools in the managed code environment, compacting a portion of the memory used by the manacled code environment, or the like, or combination thereof.

In at least one of the various embodiments, native code calls may include call for accessing target platform services such as, file system access, network operation, inter-process communications, date/time functions, math functions, string processing functions, user interface functions, synchronization operations, or the like, or combination thereof.

In at least one of the various embodiments, the occurrence of the garbage collection event may be caused by various conditions, such as, a memory consumption that exceeds a defined threshold, a timer expiration, an activity level of the computer dropping below a defined threshold, or the like, combination thereof.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Development Computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like.

However client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices. Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number. Mobile Identification Number (MIN), an electronic serial number (ESN), or other device identifier. Such information may be provided in a network packet, or the like, sent between other client computers. Development Computer 116, or other computers.

Client computers 102-105 may further be configured to include a client application that enables an end-user to log into an end-user account that may be managed by another computer, such as Development Computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM). General Packet Radio Services (CPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, Development Computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Development Computer 116 is described in more detail below in conjunction with FIG. 3. Briefly, however, Development Computer 116 includes virtually any network computer capable of performing actions for generating software applications for a client computer.

Although FIG. 1 illustrates Development Computer 116 as a single computer, the innovations and/or embodiments are not so limited. For example, one or more functions of Development Computer 116 may be distributed across one or more distinct network computers. Moreover, Development Computer 116 is not limited to a particular configuration such as the one shown in FIG. 1. Thus, in one embodiment, Development Computer 116 may be implemented using a plurality of network computers and/or client computer. In other embodiments, development computer may operate as a plurality of network computers within a cluster architecture, a peer-to-peer architecture, or the like. Further, in at least one of the various embodiments, Development Computer 116 may be implemented using one or more cloud instances in one or more cloud networks.

Illustrative Client Computer

Figure 2:
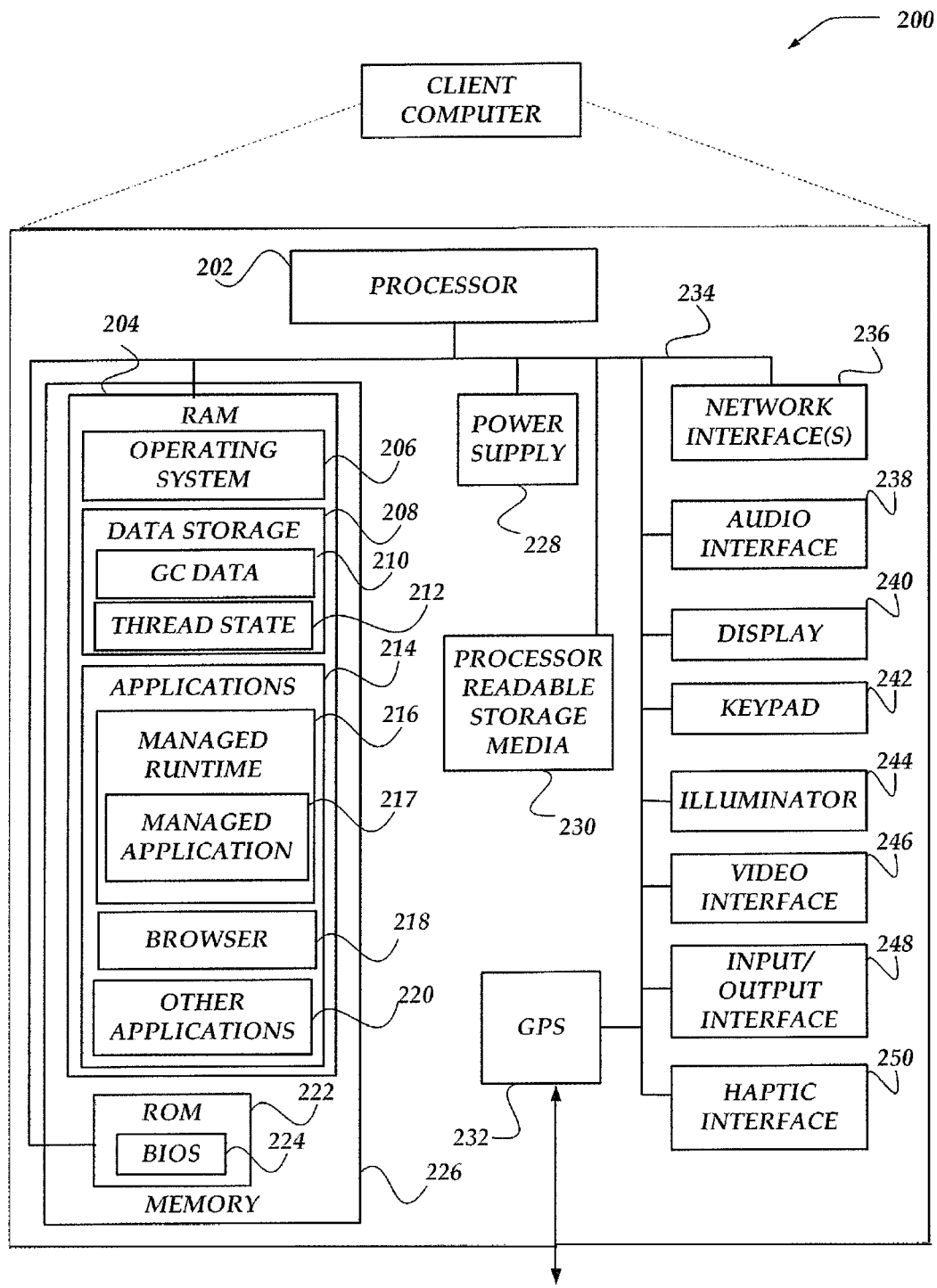
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, (DMA, TDMA, GPRS, EDGE, WCDMA, HSDPA, LTE, user datagram protocol (UDP), transmission control protocol Internet protocol (TCP/IP), short message service (SMS), WAP, ultra wide band (UWB), IEEE 802.16 Worldwide Interoperability for Microwave Access (WiMax), session initiated protocol realtime transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content. In at least one of the various embodiments, a portion of data storage 208 may be arranged to store garbage collection data (GC data) 210 for storing memory object and object information related to garbage collection. Also, in at least one of the various embodiments, a portion of data storage 208 may be arranged to store thread state information 212 for threads that may be managed by managed runtime 216.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220.

Further, applications 214 may include one or more managed runtime environments, such as managed runtime 216. Also, one or more managed applications, such as, managed application 217 may be hosted by managed runtime 216.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Development Computer 116 as shown in FIG. 1.

Other applications 220 may include, but are not limited to, calendars, search programs, email clients, IM applications, SMS applications, voice over Internet Protocol (VOW) applications, contact managers, task managers, transcoders, database programs, word processing programs, software development tools, security applications, spreadsheet programs, games, search programs, and so forth.

Illustrative Network Computer

Figure 3:
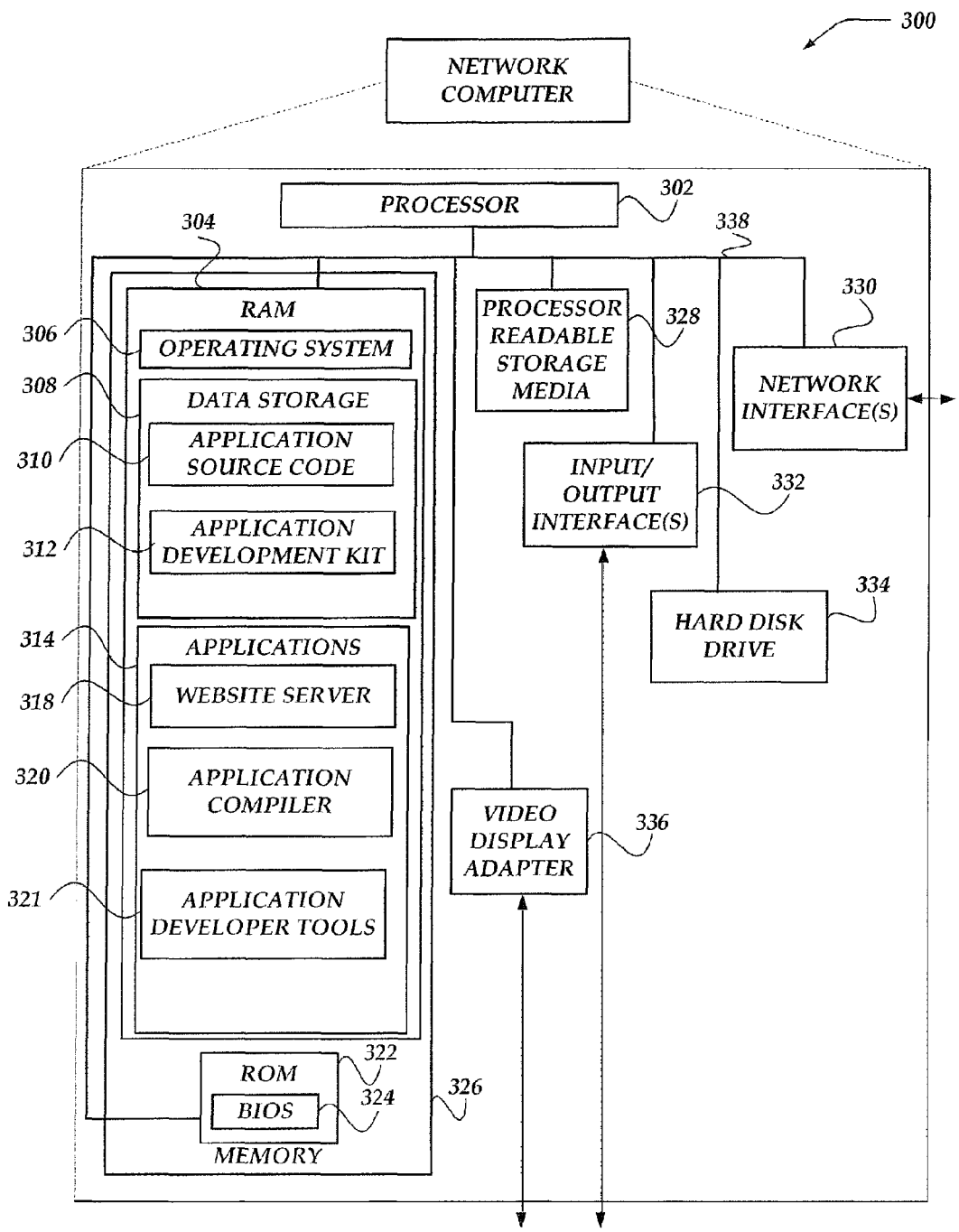
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example Development Computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM. EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 376 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include application source code 310. In at least one of the various embodiments, application source code 310 may include information, such as, one or more files, resources, projects, or the like, used for generating executable application. Also, in at least one of the various embodiments, data storage 308 may include, one or more of application development kit 312 representing information and/or tools for generating executable applications, including managed applications, targeted for one or more target platforms.

Applications 314 may include computer executable instructions, which may be loaded into mass memory and run on operating system 306. Examples of application programs may include transcoders, schedulers, calendars, database programs, word processing programs. Hypertext Transfer Protocol (HTTP) programs, customizable user interface programs, IPSec applications, encryption programs, security programs, SMS message servers, IM message servers, email servers, account managers, and so forth. Applications 314 may also include, application compiler 320 for performing actions for generating executable applications, including managed applications, for one or more target platforms.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML SGML, HTML, XML, Compact HTML (cHTML), Extensible HTML (xHTML), or the like.

Illustrative Architecture

Figure 4:
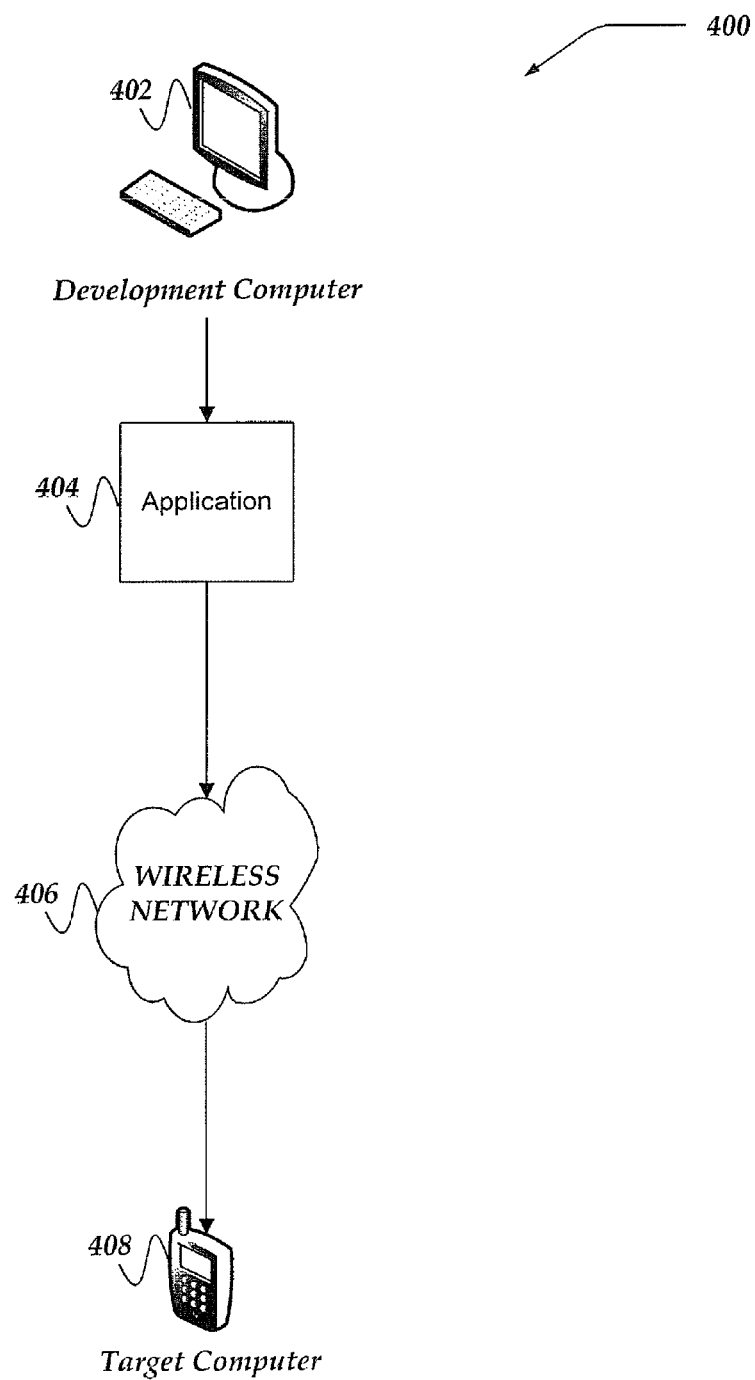
FIG. 4 illustrates a system for application development for generating application that may employ non-precise garbage collection in non-cooperative systems, in accordance with at least one of the various embodiments.

FIG. 4 illustrates system 400 for application development for generating application that may employ non-precise garbage collection in non-cooperative systems, in accordance with at least one of the various embodiments. In at least one of the various embodiments, system 400 comprises components for developing software applications targeted for one or more computers, such as, mobile computers, client computers, game consoles, set-top television boxes, smart televisions, media broadcasting appliances, or the like. In at least one of the various embodiments, system 400 may comprise one or more development computers, such as, development computer 402. In at least one of the various embodiments, development computer 402 may be a network computer or a client computer that is arranged to include tools and facilities that enable software programmers/application developers to create and generate applications for one or more target computers/devices. In at least one of the various embodiments, application developer tools 321 and/or application compiler 320 may be arranged to include one or more of the tools and facilities that enable software programmers to create and generate applications. For example, source code editors, compilers, linkers, software development kits, libraries, user interface design tools, or the like, or combination thereof.

In at least one of the various embodiments, application 404 represents compiled software application that has been generated by a development computer, such as, development computer 402. In at least one of the various embodiments, for this example, application 404 may be considered to be a managed application, that is arranged execute in a managed runtime environment, such as, managed runtime 216.

For example, applications developed using a computer language, or development platform, such as, Java/JVM (Java Virtual Machine), C#/.Net, or the like, may be arranged to be hosted in a managed runtime that performs garbage collection for the application when it executes on the target computer. In at least one of the various embodiments, some target computers may interfere with or restrict garbage collection procedures performed by the managed runtime. Typically, target computers having such restrictions may be mobile computers, client computers, smart televisions, game consoles, set-top cable boxes (for televisions), smart home appliances, or the like.

In at least one of the various embodiments, often if an application is ready to be deployed to a target computer, it may be provided to the target computer over a network such as network 406. In at least one of the various embodiments, network 406 may be comprised of one or more networks, such as, network 110 or wireless network 108, or combination thereof.

In at least one of the various embodiments, target computer 408 represents one or more of the various kinds of computers that may be targeted by application 404. As discussed above, such computers may include, mobile computers, client computers, smart televisions, game consoles, set-top cable boxes (for televisions), smart home appliances, or the like.

In at least one of the various embodiments, target computer 408 may be provided application 404 over a network such as network 406. Also, in at least one of the various embodiments, target computer 408 may be provided application 404 using computer readable media, such as, USB thumb drives, memory cards, or the like. Also, for some embodiments, application 404 may be provided to an online application store and/or online application marketplace that enables one or more target computers to download and install the application over a network.

Figure 5:
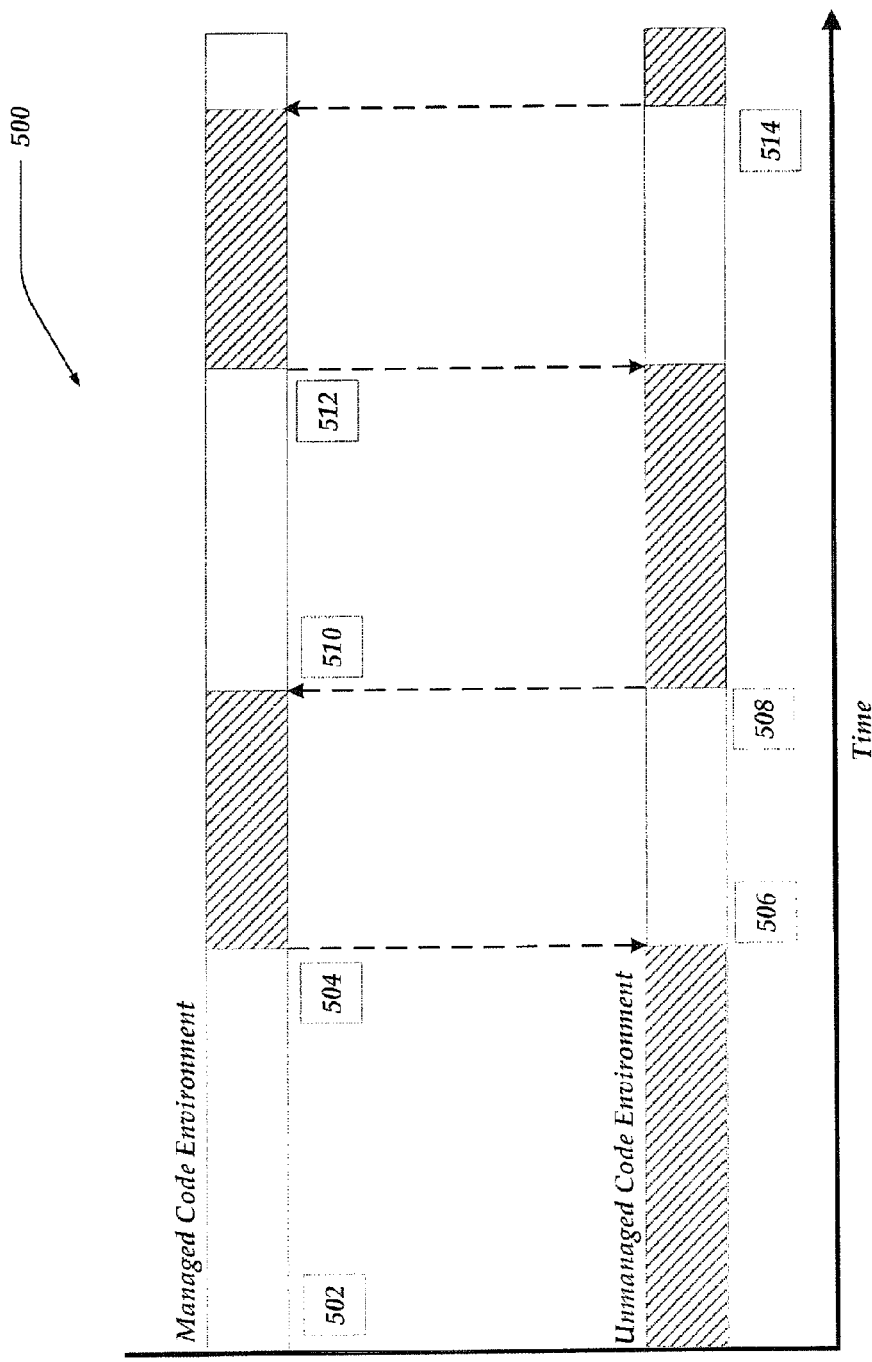
FIG. 5 shows a logical timing/sequence diagram for a sequence that represents a managed thread executing on a target platform, in accordance with at least one of the various embodiments.

FIG. 5 shows a logical timing/sequence diagram for sequence 500 representing a managed thread executing on a target platform, in accordance with at least one of the various embodiments. In at least one of the various embodiments, a managed thread executing in a managed runtime environment may spend the bulk of its time executing instructions the managed code environment provided by the runtime. However, in at least one of the various embodiments, at various times, depending on the application/task being executed, the managed thread may execute instructions (e.g., native code calls) or otherwise interact with the unmanaged code environment on the target computer. Accordingly, in at least one of the various embodiments, during its lifetime, the thread may transition between the managed code environment and the unmanaged code environment depending on the task and/or operations it performs. At step 502, the thread may be executing in the managed code environment of the runtime. At step 504, in at least one of the various embodiments, the thread may access a native system or service of the target platform, such as, retrieving data from an I/O or network interfaces. Accordingly, at step 506 in at least one of the various embodiments, the thread may be considered unmanaged while the unmanaged service request is fulfilled. At step 508, if the requested the native service completes, the thread may return to the managed code environment. At step 510, the thread may execute one or more tasks in the managed code environment. As before, in at least one of the various embodiments, at step 512, if the thread requires native services of the target platform it may transition to the unmanaged code environment, and then, at step 514, back to the managed code environment when the native service is complete.

Figure 6A:
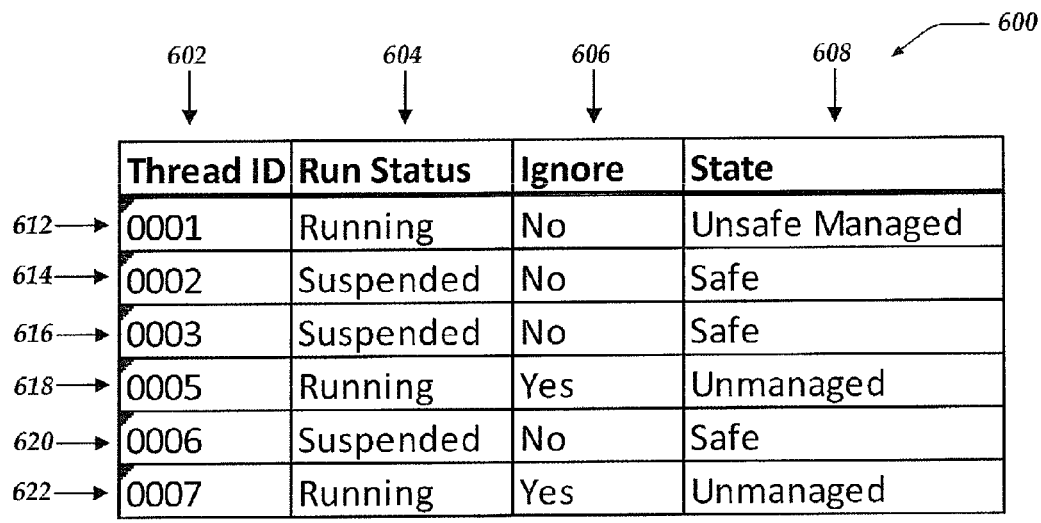
FIG. 6A shows a table representing a portion of a data structure for tracking the threads that may be under management in a managed runtime, in accordance with at least one of the various embodiments.

FIG. 6A shows table 600 representing a portion of the thread state information for a portion of threads that may be under management in a managed runtime, in accordance with at least one of the various embodiments. In at least one of the various embodiments, managed runtimes may be arranged to include one or more data structures for tracking/monitoring, its threads and their corresponding thread state information. Accordingly, in at least one of the various embodiments, column 602 may be arranged to an include identifier for the threads in the runtime. Also, in at least one of the various embodiments, column 604 may represent the status of a given thread. Though embodiments may support numerous thread status values, here for brevity and clarity status may be one of "Running" or "Suspended" though in some embodiments there may more states (See, FIG. 11) In at least one of the various embodiments, column 606 may indicate if the thread may be ignored with respect so some operations and/or conditions related to garbage collection. And, in at least one of the various embodiments, column 608 may include state information that relates to if the garbage collector may be proceed. In at least one of the various embodiments, at various times, the runtime may update the information for each thread. In at least one of the various embodiments, if all threads have a state of Safe, or Unmanaged the garbage collector may perform garbage collection for the runtime.

Further, thread 612 represents a thread that may be currently running that cannot be ignored by the garbage collector. The state of Unsafe Managed indicates the thread is executing in the manage code environment but it is unsafe because it is still running. In contrast, threads 614, 616, and 620, are also in the managed code environment, but since they are suspended (rather than running) they may be marked as safe.

In this example, in at least one of the various embodiments, threads 618 and 622 are also running rather than suspended, but since they are in the unmanaged code environment, they may be indicated as ignorable. This means that the garbage collector does not need to wait for them become safe before proceeding with garbage collection.

Figure 6B:
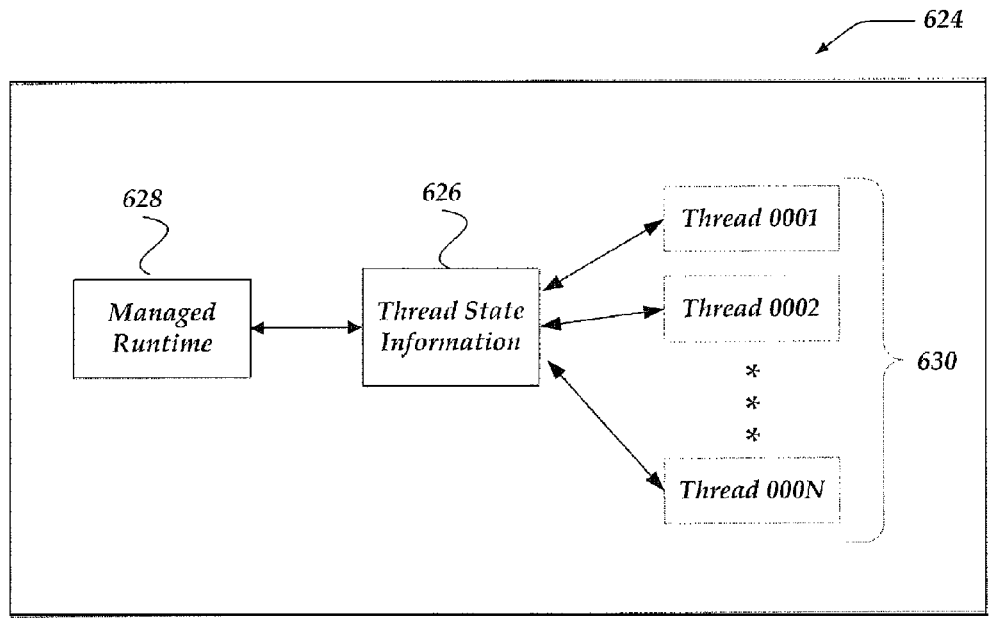
FIG. 6B shows a logical representation of a thread state information on a target computer, in accordance with at least one of the various embodiments.

FIG. 6B shows a logical representation of a thread state information on target computer 624 in accordance with at least one of the various embodiments. In at least one of the various embodiments, a target computer, such as, target computer 624 may be hosting a managed runtime, such as, managed runtime 628. In at least one of the various embodiments, thread state information, such as, thread state information 626 may be arranged for communication thread state and transition information between threads 630 and managed runtime 628.

In at least one of the various embodiments, thread state information 628 may be arranged as a state machine or other similar data structure/system for enabling the managed runtime and the threads to communicate with each other. In at least one of the various embodiments, managed 628 and runtime and threads 630 may be arranged to examine and/or poll thread state information 626 for determining one or more actions to attempt. For example, in at least one of the various embodiments, managed state 628 may be ready to initiate garbage collection. Accordingly, for this example, managed runtime 628 may update the thread state information for each of threads 630 to signal that they should suspend themselves. Then, continuing with this example, as each of threads 630 checks/polls their corresponding thread information state, they may attempt to take actions to suspend themselves and update thread state information accordingly. In at least one of the various embodiments, thread state information may be maintained for each of threads 630.

In at least one of the various embodiments, the particular states and transitions of the thread state information may vary depending on embodiments and/or target platforms. See, FIG. 11, for one example of a state machine that may be employed for representing thread state information in accordance with at least one of the various embodiments. Further, in at least one of the various embodiments, thread state information 212 in FIG. 2 may be arranged to store thread state information 626.

Generalized Operation

FIGS. 7-10 represent the generalized operations of non-precise garbage collection in non-cooperative systems in accordance with at least one of the various embodiments. In at least one of the various embodiments, processes 700, 800, 900, and 1000 described in conjunction with FIGS. 7-10 may be implemented by and/or executed on a single network computer, such as network computer 300 of FIG. 3. In other embodiments, these processes or portions of process thereof may be implemented by and/or executed on a plurality of network computers, such as network computer 300 of FIG. 3. Also, in at least one of the various embodiments, processes 700, 800, 900, and 1000 may be performed by a target computer, including, mobile computers, client computers, smart televisions, game consoles, set-top cable boxes (for televisions), smart home appliances, or the like, such as, such as, client computer 200. Further, in at least one of the various embodiments, the processes described in conjunction with FIGS. 7-10 may be operative in as described in conjunction with FIGS. 4-6.

Figure 7:
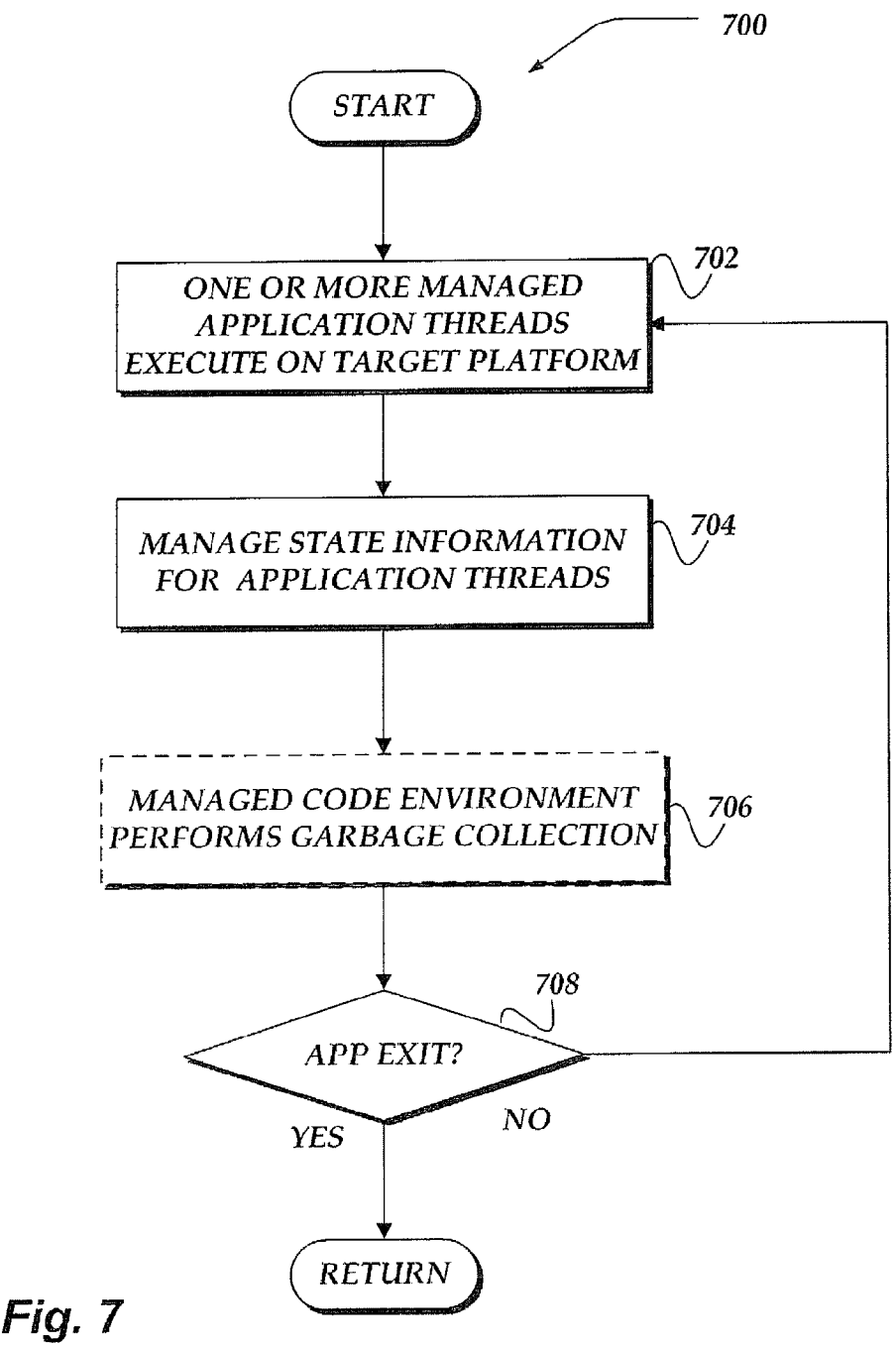
FIG. 7 shows an overview flowchart for a process for non-precise garbage collection in non-cooperative systems in accordance with at least one of the various embodiments.

FIG. 7 shows an overview flowchart for process 700 for non-precise garbage collection in non-cooperative systems in accordance with at least one of the various embodiments. After a start block, at block 702, in at least one of the various embodiments, one or more managed application threads may be executing on a target platform. In at least one of the various embodiments, multiple threads for one or more managed applications may be running under the management of a managed runtime. The managed runtime may be arranged to monitor and track the thread state information for each thread associated with the managed applications. Further, since the thread may be managed by a managed runtime, the memory objects associated with each thread may also be tracked, and/or referenced using various garbage collection data (GC data).

In at least one of the various embodiments, various characteristics of each thread may be determined and monitored. Common characteristics, include thread identity, thread ownership (e.g., which application owns the thread), running time, memory consumption, privilege level, priority level, or the like, combination thereof. In at least one of the various embodiments, the particular characteristics made available to the managed runtime may vary depending on the target platform. In some embodiments, the target platforms may be arranged to enable access to more or fewer thread characteristics. Further, in at least one of the various embodiments, characteristics, such as one or more of those described in FIG. 6 may be monitored/maintained as well.

At block 704, in at least one of the various embodiments, the thread state information may be actively managed during the lifetime of the thread. In at least one of the various embodiments, the threat state information may be updated by the managed runtime and/or the thread itself depending on various conditions that the thread may experience during execution. In general, the state information may be updated to inform the garbage collector if a thread should participate in a garbage collection action and to inform a thread what actions it should take to prepare for the garbage collection actions. The thread may poll its thread state information at various times for determining what actions it should take. Note, this enables the managed runtime and the threads to communicate even though the hosting target platform does not support direct communication with the threads.

In at least one of the various embodiments, the thread state information may indicate to a thread that it should save its garbage collection data (GC data) if the thread is about to execute a native code call that may exceed a defined duration value. Updating the GC data for the thread may enable some garbage collection actions to proceed even though one or more threads may be executing long running native code calls.

However, in some cases, if the native code call is determined by the managed runtime to have the ability/possibility to interact with managed memory objects the thread update the thread state information to prevent garbage collection actions from proceeding. In at least one of the various embodiments, each thread may transition through many states that are tracked using thread state information during its execution lifetime. In at least one of the various embodiments, the managed runtime may be arranged to determine if a thread is about to attempt execute instructions that may require the thread to transition to the unmanaged code environment. For example, in at least one of the various embodiments, during compilation of the managed application, the compiler may be arranged to automatically insert code into the application for determining if the thread is about to execute a native code call or otherwise, transition to the unmanaged code environment. In some cases, since many transitions may be the result of a managed thread calling native system calls on the target platform, the compiler may be arranged to insert code for preparing for the transition. In at least one of the various embodiments, the application programmer may be unaware that the source code in the application may result in a call to a native system call. Accordingly, the compiler may be arranged to insert such code automatically and without the knowledge or consent of the application developer. In other words, inserting such code may be considers part of the compilation process that occurs when the executable application is generated.

In at least one of the various embodiments, the runtime may be arranged to update the thread state information related to whether the thread has transitioned to an unmanaged code environment. For example, in at least one of the various embodiments, the thread state information may be updated to indicate that the thread may be ignorable and unmanaged indicating that it may be in the unmanaged code environment.

At block 706, in at least one of the various embodiments, optionally, the managed runtime environment may perform garbage collection on the memory objects under its management. In at least one of the various embodiments, this block may be optional because garbage collection may be attempted at various times as needed by the managed runtime. As discussed above, one or more conditions may occur that may trigger the managed runtime to initiate garbage collection. Further, in at least one of the various embodiments, just because managed runtime determines that it should perform garbage collection, it refers to the thread state information to determine if it may proceed with garbage collection actions.

At decision block 708, in at least one of the various embodiments, if the application exits, control may be returned to a calling process; otherwise, control may loop back block 702.

Figure 8:
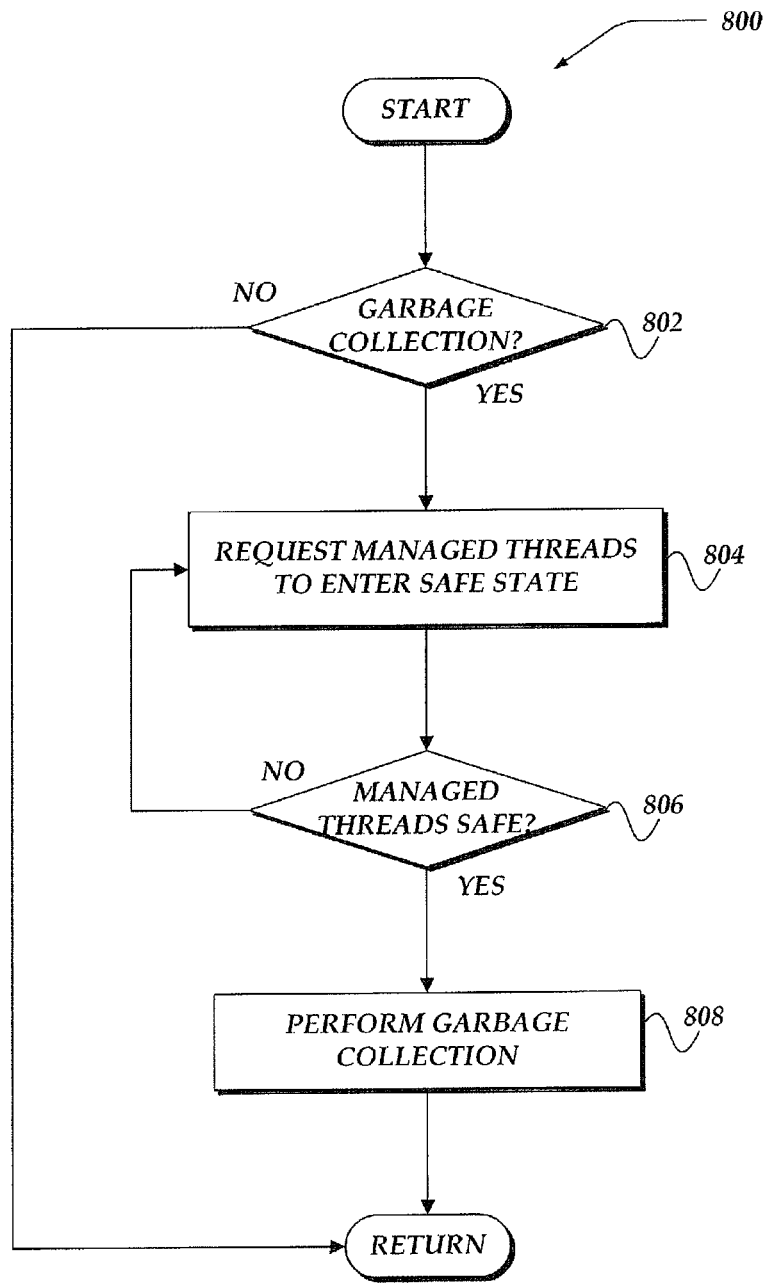
FIG. 8 shows an overview flowchart for a process for performing garbage collection in accordance with at least one of the various embodiments.

FIG. 8 shows an overview flowchart for process 800 for performing garbage collection in accordance with at least one of the various embodiments. After a start block, at decision block 802, in at least one of the various embodiments, if the managed runtime is attempting to perform garbage collection, control may flow to block 804; otherwise, control may be returned to a calling process. As discussed above, in at least one of the various embodiments, the runtime may determine it is time to conduct garbage collection based on a number of factors, such as, memory consumption exceeding a defined threshold, a time limit expiring, activity level of the target platform dropping below a defined threshold, or the like, or combination thereof.

In at least one of the various embodiments, the particular conditions for triggering the garbage collection may be defined in configuration information for the managed runtime, managed code environment, and/or the managed applications.

In at least one of the various embodiments, the managed runtime may be arranged to update the thread state information for each thread to indicate that it is attempting to perform garbage collection. For example, in at least one of the various embodiments, the managed runtime may update the thread state information to request that the threads transition to state that may be safe for garbage collection.

At block 804, in at least one of the various embodiments, the managed runtime may be arranged to request and wait for its managed threads to reach a safe state. In at least one of the various embodiments, garbage collection may require performing actions such as memory tracing and other memory bookkeeping operations on the memory used by the runtime. Accordingly, in at least one of the various embodiments, the runtime may be arranged to wait until its managed threads are guaranteed to refrain from accessing memory. In at least one of the various embodiments the manage runtime may be arranged to examine the thread state information for each thread to determine if threads are safe for garbage collection.

At decision block 806, in at least one of the various embodiments, if the managed threads are in a safe (for garbage collection) state, control may flow block 808; otherwise, control may loop back to block 804.

In at least one of the various embodiments, the managed runtime may monitor a thread state information table such as table 600, state diagram 1100, or the like, to determine if all of the managed threads have reached a state that is safe for garbage collection. In at least one of the various embodiments, threads that are tagged as unmanaged and/or ignorable are not considered In at least one of the various embodiments, there are at least two ways for determining if a thread may be safe for garbage collection. In at least one of the various embodiments, if the managed thread has a thread state of "Running", the runtime may update the thread state information for the thread to indicate the thread should try to enter a suspend state (in FIG. 11 this is the suspend Requested state). Thus, if the thread checks its thread state information it may discover that the managed runtime is requesting that it suspend itself for garbage collection. In at least one of the various embodiments, if the thread updates its thread state information to indicate to the runtime that it has save its GC data and suspended itself, the thread may be considered safe.

Accordingly, a thread that is running (in the Running state) is expected to be periodically check its thread information state to see if the runtime has requested it to save its GC data and suspend itself for garbage collection. In at least one of the various embodiments, if the thread is ready to suspend itself (after updating/saving its GC data) it may communicate its status to the managed runtime by updating its thread state information before suspending itself.

Alternatively, in at least one of the various embodiments, if the managed thread is in the State Saved state, the runtime may transition it to the System Suspended state, which prevents the thread from further execution after it has finished its long running native function. The thread will remain running and won't report back to the GC unless it finishes its long running task too early, in which case it will suspend itself.

At block 808, in at least one of the various embodiments, since the managed threads are in a safe state, the managed runtime may perform one or more garbage collection actions to manage its memory. In at least one of the various embodiments, if a thread that may be executing a long running native code call completes its native functions earlier than expected and while garbage collection actions are in process, the thread may suspend itself and update its thread state information accordingly. Next, control may be returned to a calling process.

Figure 9:
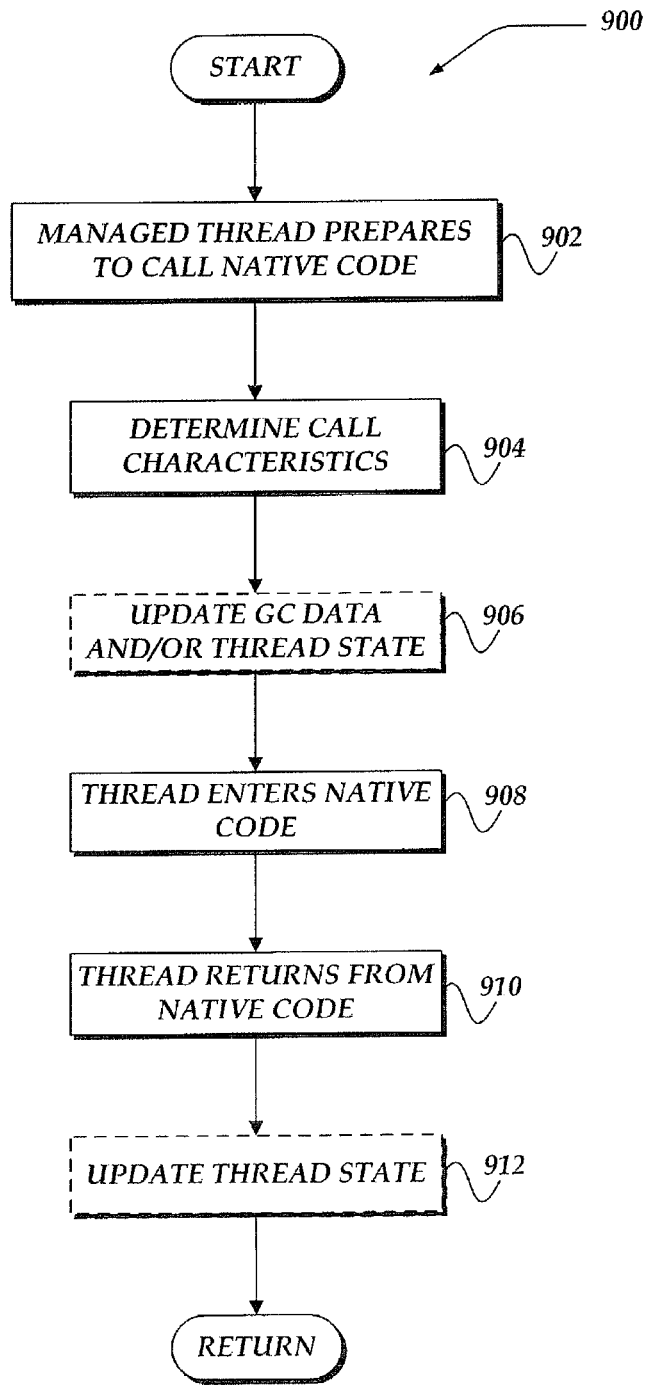
FIG. 9 shows a flowchart for a process for tracking thread state information in accordance with at least one of the various embodiments.

FIG. 9 shows a flowchart for process 900 for tracking thread state information in accordance with at least one of the various embodiments. After a start block, at decision block 902, in at least one of the various embodiments, a managed thread may prepare to call native code, or otherwise transition to an unmanaged code environment. In at least one of the various embodiments, an application compiler, such as, application compiler 320 may be arranged to insert code into the application that may indicate if the thread is about to call a native service or function. Further, the compiler may insert preamble code that can perform one or more actions if a call to native code is encountered.

At block 904, in at least one of the various embodiments, the managed runtime may determine one or more characteristics of related to the call that may transition the thread into an unmanaged state.

In at least one of the various embodiments, during compilation call to native code may be marked and/or tagged to provide hints to the runtime on how they should be handled. Also, in at least one of the various embodiments, the runtime may examine the parameters that may be passed to a native call to determine one or more how the native call may impact managed runtime procedures, such as, garbage collection. In at least one of the various embodiments, the managed runtime may determine an estimate of how long the thread may be unmanaged (e.g., running the unmanaged code environment).

In at least one of the various embodiments, the compiler may be arranged to employ pre-defined configuration information that may include information for classifying the native code calls.

Accordingly, based on this information, for some native code calls, the compiler may tag or mark native code calls as being short lived or long lived. Accordingly, during execution of the application, the runtime may accept the compiler's classification.

Also, in at least one of the various embodiments, for some native code calls the compiler may be unable to predict how long some native code calls may take to complete. Or if it the native code calls may impact garbage collection. Accordingly, in at least one of the various embodiments, the compiler may insert code into the application for making the determination at runtime. In at least one of the various embodiments, the runtime may examine the parameters that may be passed into the native code call to determine how the native code call may impact the garbage collection process. In at least one of the various embodiments, if the parameters being passed to the native code call include large memory buffers, the runtime may determine that the native code call may take longer than a call that reference small buffers. Accordingly, in at least one of the various embodiments, a characteristic of the native code call, may be determined based on a memory size of at least one argument to the native code call.

Likewise, if the native code call is determined to reference a small file on the file system, the runtime may determine that native operations on the file may take a shorter time that if the file was of a large size.

In at least one of the various embodiments, the managed runtime may determine if there are managed memory objects associated with the pending native code call. For example, if references to managed memory objects are passed in the native code call for receiving data, the managed runtime may determine that the native code call is likely to write to the referenced memory objects. Likewise, in at least one of the various embodiments, if references to managed memory objects are passed to the native code call for reading, the managed runtime may determine that the native code call may read from memory objects while it is executing.

In at least one of the various embodiments, short lived native code call may include simple operations that are provided by one or more native systems, services, libraries, or the like. For example, math functions, string processing functions, data/time functions, or the like, may be built-in services provided by native code on the target platform. These type of short-lived functions may be deemed to run to completion fast enough such that they are not likely to disturb garbage collection. In practice, the particular native code calls deemed to be short lived may be determined by experimentation. Also, the particular set of native code calls may vary depending on the target platform. Accordingly, in at least one of the various embodiments, configuration information may employed by the compiler for determination the native code calls that may be classified as short-lived. Likewise, in at least one of the various embodiments, configuration information may be employed for determining which native code calls may impact garbage collection, such as, long-running calls, calls that may read from managed memory objects, calls that may write to managed memory objects, or the like.

Further, in at least one of the various embodiments, native code calls that may be determined to have a run duration that exceeds a defined duration may be determined to be long-lived native code calls that may require the GC data for the thread to be saved for starting the long running native operation. Accordingly, the managed runtime may update the thread's state information to signal it save its GC data before starting the long running native code call. Likewise, in at least one of the various embodiments, native code calls that may be determined to have a run duration that is below a defined duration may be determined to be short-lived native code calls that may be executed directly without the requirement to update the state information for the thread.

In at least one of the various embodiments, the managed runtime has at least two categories of native code calls, internal native code calls and external native code calls.

In at least one of the various embodiments, internal native code calls expose function that may be used by the managed runtime to expose its functionality to managed code. For example, in at least one of the various embodiments, internal native code calls may include, creating managed objects, starting a thread, reading from a file, or the like.

In at least one of the various embodiments, external native call code expose functions that are those known or called from managed code but may be otherwise outside of the knowledge of the managed runtime. For example, in at least one of the various embodiments, external native code call may include functions from third party libraries that are native to the target platform but deliberately called from within the managed application by the application developer.

Further, in at least one of the various embodiments, in some circumstances, the managed runtime may dynamically replace a managed call with a native code call. If this occurs the state information for the thread may be updated by the managed runtime to indicate that it is not safe for garbage collection.

In at least one of the various embodiments, a managed runtime may be arranged to be unconcerned with the actual operations performed by the native code call. In some embodiments, the primary concern may be that the duration of the native code call may be too long or that the native code call may access managed memory. Accordingly, in at least one of the various embodiments, if a native code call may possibly access managed memory, the thread state information must remain in an unsafe state that prevents the garbage collector from running.

In at least one of the various embodiments, if a native code call may take too long to execute, (e.g., the run duration is expected to exceed a defined/configured value) the garbage collection data for the thread must be saved and the thread state information may be updated to indicate that the thread is safe for garbage collection (e.g., in the State Saved state). Accordingly, the garbage collector may perform garbage collection actions without having to wait for the long running native code call to finish.

In at least one of the various embodiments, internal native code calls may be arranged to access managed memory and also may in some cases take a long time. Accordingly, if an internal native code call occurs, initially the thread information state may not be updated changed. However, if it is determined that this native code call is about to perform a possibly long operation, the thread state information may be updated to transition the thread to a safe and then back.

In at least one of the various embodiments, external native code calls may be disabled from accessing managed memory and may take a long time to execute. Accordingly, in at least one of the various embodiments, the managed runtime updates the thread state information to tell the thread to save the GC data for the thread before calling the native code call—and thus enter a safe state for garbage collection.

At block 906, in at least one of the various embodiments, optionally, the garbage collection data and/or the thread state information for the threads that may be transitioning to the unmanaged code environment may be saved/updated. In at least one of the various embodiments, this actions associated with this block may be optional because in some cases, the managed runtime may determine that the GC data and/or thread state does not need to be updated.

In at least one of the various embodiments, the characteristics determined for the pending native code calls that may have been determined in block 904 may indicate that the thread state information for the thread making the native code call (e.g., transitioning into the unmanaged code environment) should be updated to reflect that the native code call may impact garbage collection. In other words, in at least one of the various embodiments, the thread state information may be updated to indicate the thread is executing in an unmanaged code environment.

As described above, in at least one of the various embodiments, state information for threads that are determined to be calling long running native code calls may be updated to reflect that they should be ignored with respect to garbage collection. For these threads, the native code calls may be long running, but since the threads may save their gc data for running the native code calls they may be determined not to impact or mutate managed memory objects.

In at least one of the various embodiments, if the thread state information needs to be updated, in at least one of the various embodiments, fields in one or more data structures, such as, table 600 may be updated to reflect to current state information for the thread. Likewise, in at least one of the various embodiments, if the gc data for a thread needs to saves, data structures associated with the managed runtime's garbage collector may be updated accordingly.

At block 908, in at least one of the various embodiments, the thread may transition to the unmanaged code environment for performing one or more services native to the target platform. In at least one of the various embodiments, the thread may execute the native code of the target platform corresponding to the native code call. During this time the thread may be considered to be executing in the unmanaged code environment.

At block 910, in at least one of the various embodiments, upon completion or termination of the native code call to the unmanaged code environment, the managed runtime may be arranged to prepare the thread to transition back to the executing in the managed code environment. In at least one of the various embodiments, the compiler may insert code for performing actions for transitioning the thread back to the managed code environment.

At block 912, in at least one of the various embodiments, optionally, the state information for the thread may be updated by the managed runtime. In at least one of the various embodiments, the steps performed by this block may be optional because in some cases, the thread state information does require updating. In at least one of the various embodiments, threads that had their state information updated in block 906 may be updated again to reflect that they have completed the execution of the native code call and have returned to the manage code environment. Next, control may be returned to a calling process.

Figure 10:
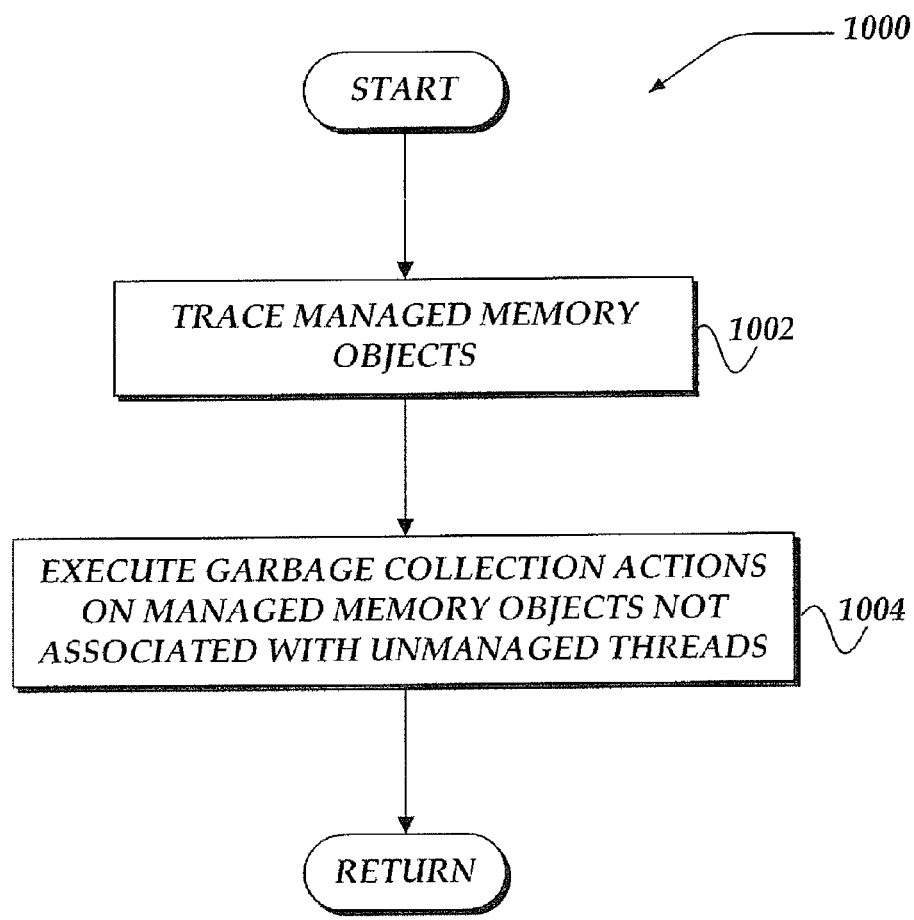
FIG. 10 shows an overview flowchart for a process for garbage collection for a managed runtime in accordance with at least one of the various embodiments.

FIG. 10 shows an overview flowchart for process 1000 for garbage collection for a managed runtime in accordance with at least one of the various embodiments. After a start block, at decision block 1002, in at least one of the various embodiments, the managed runtime may trace the memory objects that are under its management. In at least one of the various embodiments, the managed runtime may be arranged to trace the managed memory objects based on each thread that is determined to be safe for garbage collection. For example, managed memory object may be stored/organized using various well-known data structures, such as, graphs, trees, arrays, pools, hash tables, or the like, or combination thereof, that may be traversed to identify and characterize the managed memory objects. One of ordinary skill in the art will appreciate that various memory management/tracing methods may be employed with departing from the scope of these innovations.

At block 1004, in at least one of the various embodiments, the managed runtime may be arranged to perform garbage collection actions on the one or more managed memory objects that are referenced by threads that may indicated as safe for garbage collection. In at least one of the various embodiments, the managed runtime may be arranged to execute one or more well-known garbage collections operations, such as, moving, freeing, or the like, on the managed memory objects that are referenced by the safe. Next, control may returned to a call process.

Figure 11:
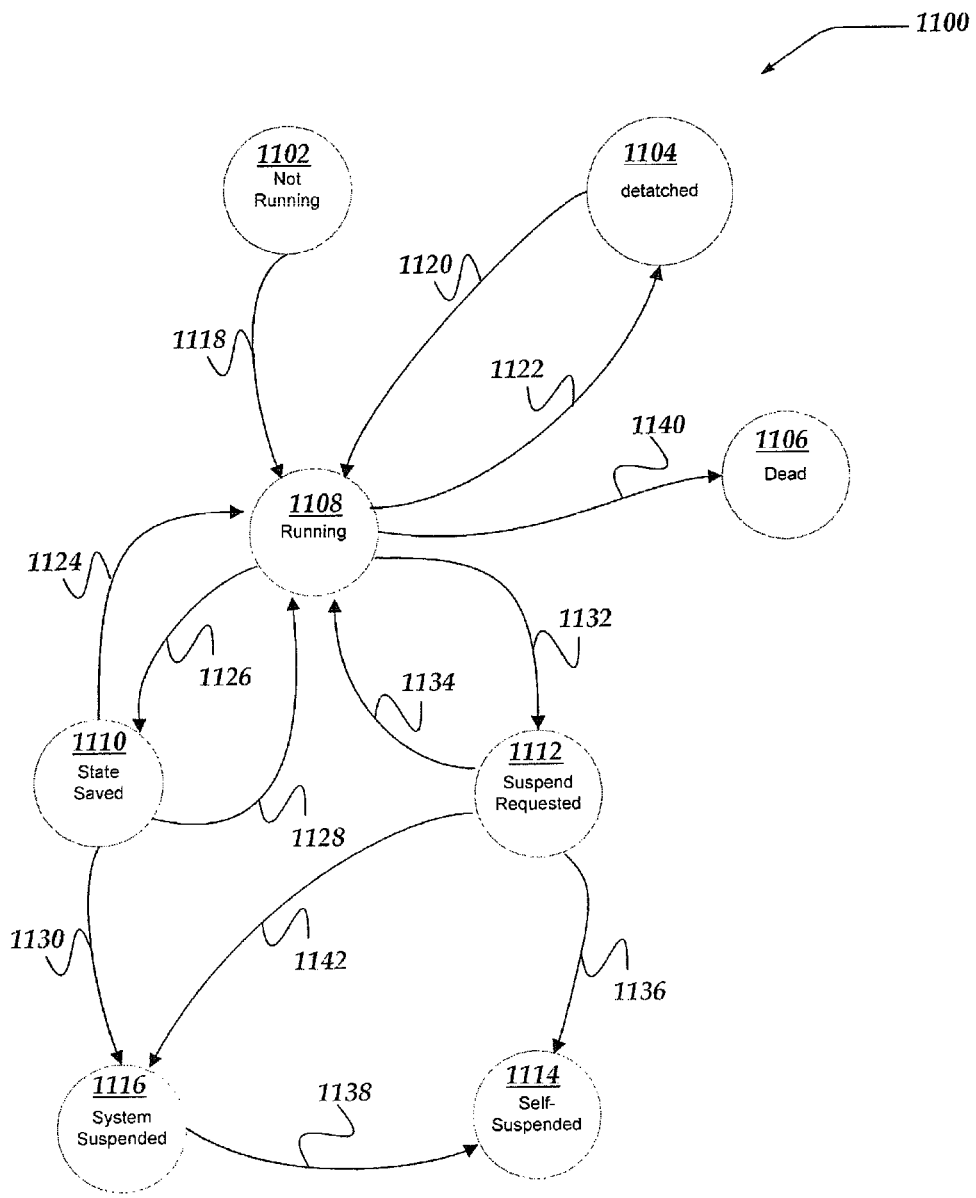
FIG. 11 shows a state diagram of a process for non-precise garbage collection for non-cooperative systems in accordance with at least one of the various embodiments.

FIG. 11 shows a state diagram of process 1100 for non-precise garbage collection for non-cooperative systems in accordance with at least one of the various embodiments. Process 1100 is a state diagram that represents an example of states and transitions that may be included in the thread state information for threads managed by a runtime on a target platform in accordance with at least one of the various embodiments.

In at least one of the various embodiments, threads in the target platforms may be in one of the following states (shown as circles in the FIG. 11): Not Running 1102, the initial state of ever thread managed by the managed runtime; Detached 1104, the initial state of every thread started not been managed by the runtime but becomes managed; Dead 1106, the final state of every thread; Running 1108, the thread is running, no pending suspend requests, GC data for the thread is not saved. Thread State Saved 1110, the thread is running, no pending suspend requests, valid GC data has been saved; Suspend Requested 1112, the thread is running, it has pending suspend requests, GC data not saved yet; Self-suspended 1114, the thread is suspended and will discard its GC data after it resumes running; and System Suspend 1116, the thread is suspended and will keep GC data after it resumes running.

As indicated in the diagram, threads may undergo several state transitions during their lifetime on the target platform. State transitions are indicted as arrow connector in the state diagrams. The direction of the arrow indicates the order in how the transition between states may occur. As discussed above, manage runtimes, such as, managed runtime 216 and/or 628 may be arranged to update the thread state information for its managed thread. Also, running threads may be arranged to check their thread information while running to determine if the thread should take any actions based on its current thread state information.

In at least one of the various embodiments, state transitions in diagram 1100 include: Start 1118, a managed thread is created; Attach 1120, an unmanaged thread began interacting with the managed runtime; Detach 1122, a managed thread finishes interacting with the managed runtime and becomes unmanaged; Terminate 1140, a thread finishes executing; Request Suspend 1132 (and transition 1138), the managed runtime requested the thread to suspend execution for an upcoming garbage collection; State Poll 1136, the thread checked its state to determine if something needs to be done; Restart 1134, the managed runtime requested that the thread resumes execution; Begin Blocking Operation 1126 (and transition 1142), the thread is about to begin a blocking operation; Finish Blocking Operation 1128 (and transition 1138), the thread just finished a blocking operation; Abort Save 1124, the thread needs to discard its GC data and return to running.

In at least one of the various embodiments, if a managed thread performs a native code call, and if that call exceeds the defined duration, the thread may save its GC data and updated its thread state information to transition (transition 1126) to State Saved (state 1110). When the native code call finishes, the thread may follow transition 1124 to transition back to state 1108, (Running).

In at least one of the various embodiments, transition 1136 (State Poll) may occur at multiple times during execution of threads (of an application), both managed code (as compiled by the managed runtime) and the managed runtime itself, may be arranged to regularly check the thread state information for the current thread state to see if an action needs to be taken.

In at least one of the various embodiments, transition 1124 (Abort Save) may occur if the managed runtime has previously optimistically determined that a native code call is not going to interact with managed objects so it has transitioned to state 1110 (State Saved) where during such a call, the managed runtime later determines that the native code call does in fact interact with managed memory object it discards its GC data and transitions the thread to the Running state 1108.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing memory for an application using a computer, wherein the computer performs actions, including:
   when at least one thread of a plurality of threads encounters a native code call during the execution of the application in a managed code environment, further actions are performed, including:
      determining at least one characteristic of the native code call based in part on configuration information that is associated with a target platform for the application;
      when the at least one characteristic of the native code call indicates that a duration of the native code call exceeds a defined duration threshold, updating at least state information for the at least one thread to at least indicate that the at least one thread is executing in an unmanaged code environment; and
      when the native code call completes, updating the state information for the at least one thread to at least indicate that the at least one thread is executing in the managed code environment; and
   when a garbage collection event occurs, further actions are performed, including:
      updating state information for each of the plurality of threads to communicate a suspend request to the plurality of threads;
      waiting for each thread of the plurality of threads that is executing in the managed code environment to become safe for garbage collection; and
      when each thread in the managed code environment is safe for garbage collection, executing one or more garbage collection actions to manage the memory for the application.

2. The method of claim 1, further comprising, when the at least one characteristic of the native code call indicates that a duration of the native code call is less than a defined duration, executing the native code call, wherein the state information for the at least one thread is unmodified.

3. The method of claim 1, further comprising, when the at least one characteristic of the native code call indicates that the native code call reads or writes one or more managed memory objects, updating at least state information and garbage collection data for the at least one thread when the execution time of the native code call exceeds a defined duration.

4. The method of claim 1, wherein waiting for each thread of the plurality of threads that is executing in the managed code environment to become safe for garbage collection, further comprises, examining state information for each thread of the plurality of threads to determine if they are safe for garbage collection.

5. The method of claim 1, wherein determining the at least one characteristic of the native code call, further comprises, executing machine code that is automatically inserted into the application by a compiler, wherein the machine code enables the at least one characteristic of the native code call to be determined at runtime.

6. The method of claim 1, wherein executing one or more garbage collection actions, further comprises, at least one of freeing memory objects that are no longer in use, de-fragmenting one or more memory pools in the managed code environment, or compacting a portion of the memory used by the managed code environment.

7. The method of claim 1, wherein the native code call further comprises, at least one of, a file system access, a network operation, an inter-process communication, a date/time function, a math function, a string processing function, a synchronization operation, or user interface function for the target platform.

8. The method of claim 1, further comprising, generating the garbage collection event based on at least one of, a memory consumption that exceeds a defined threshold a timer expiration, or an activity level of the computer dropping below a defined threshold.

9. A system for managing memory for an application, comprising:
   a computer, including:
      a transceiver for communicating over the network;
      a memory for storing at least instructions; and
      a processor device that is operative to execute instructions that enable actions, including:
         when at least one thread of a plurality of threads encounters a native code call during the execution of the application in a managed code environment, further actions are performed, including:
            determining at least one characteristic of the native code call based in part on configuration information that is associated with a target platform for the application;
            when the at least one characteristic of the native code call indicates that a duration of the native code call exceeds a defined duration threshold, updating at least state information for the at least one thread to at least indicate that the at least one thread is executing in an unmanaged code environment; and when the native code call completes, updating the state information for the at least one thread to at least indicate that the at least one thread is executing in the managed code environment; and when a garbage collection event occurs, further actions are performed, including:

updating state information for each of the plurality of threads to communicate suspend request to the plurality of threads:

waiting for each thread of the plurality of threads that is executing in the managed code environment to become safe for garbage collection; and when each thread in the managed code environment is safe for garbage collection, executing one or more garbage collection actions to manage the memory for the application; and a development computer, including:
 a transceiver for communicating over the network;
 a memory for storing at least instructions; and
 a processor device that is operative to execute instructions that enable actions, including:
  compiling a machine code version of the application.

10. The system of claim 9, wherein the computer processor device enables further actions comprising, when the at least one characteristic of the native code call indicates that a duration of the native code call is less than a defined duration, executing the native code call, wherein the state information for the at least one thread is unmodified.

11. The system of claim 9, wherein the computer processor device enables further actions comprising, when the at least one characteristic of the native code call indicates that the native code call reads or writes one or more managed memory objects, updating at least state information and garbage collection data for the at least one thread when the execution time of the native code call exceeds a defined duration.

12. The system of claim 9, wherein waiting for each thread of the plurality of threads that is executing in the managed code environment to become safe for garbage collection, further comprises, examining state information for each thread of the plurality of threads to determine if they are safe for garbage collection.

13. The system of claim 9, wherein determining the at least one characteristic of the native code call further comprises, executing machine code that is automatically inserted into the application by a compiler, wherein the machine code enables the at least one characteristic of the native code call to be determined at runtime.

14. The system of claim 9, wherein executing one or more garbage collection actions, further comprises, at least one of freeing memory objects that are no longer in use, de-fragmenting one or more memory pools in the managed code environment, or compacting a portion of the memory used by the managed code environment.

15. The system of claim 9, wherein the native code call further comprises, at least one of, a file system access, a network operation, an inter-process communication, a date/time function, a math function, a string processing function, a synchronization operation, or user interface function for the target platform.

16. The system of claim 9, wherein the computer processor device enables further actions comprising, generating the garbage collection event based on at least one of, a memory consumption that exceeds a defined threshold, a timer expiration, or an activity level of the computer dropping below a defined threshold.

17. A computer for managing memory for an application, comprising:
 a transceiver for communicating over the network;
 a memory for storing at least instructions; and
 a processor device that is operative to execute instructions that enable actions, including:
  when at least one thread of a plurality of threads encounters a native code call during the execution of the application in a managed code environment, further actions are enabled, including:
   determining at least one characteristic of the native code call based in part on configuration information that is associated with a target platform for the application;
   when the at least one characteristic of the native code call indicates that a duration of the native code call exceeds a defined duration threshold, updating at least state information for the at least one thread to at least indicate that the at least one thread is executing in an unmanaged code environment; and
   when the native code call completes, updating the state information for the at least one thread to at least indicate that the at least one thread is executing in the managed code environment; and
  when a garbage collection event occurs, further actions are performed, including:
   updating state information for each of the plurality of threads to communicate suspend request to the plurality of threads;
   waiting for each thread of the plurality of threads that is executing in the managed code environment to become safe for garbage collection; and
   when each thread in the managed code environment is safe for garbage collection, executing one or more garbage collection actions to manage the memory for the application.

18. The computer of claim 17, wherein the computer processor device enables actions further comprising, when the at least one characteristic of the native code call indicates that a duration of the native code call is less than a defined duration, executing the native code call, wherein the state information for the at least one thread is unmodified.

19. The computer of claim 17, wherein the computer processor device enables actions further comprising, when the at least one characteristic of the native code call indicates that the native code call reads or writes one or more managed memory objects, updating at least state information and garbage collection data for the at least one thread when the execution time of the native code call exceeds a defined duration.

20. The computer of claim 17, wherein waiting for each thread of the plurality of threads that is executing in the managed code environment to become safe for garbage collection, further comprises, examining state information for each thread of the plurality of threads to determine if they are said for garbage collection.

21. The computer of claim 17, wherein determining the at least one characteristic of the native code call, further comprises executing machine code that is automatically inserted into the application by a compiler, wherein the machine code enables the at least one characteristic of the native code call to be determined at runtime.

22. The computer of claim 17, wherein executing one or more garbage collection actions, further comprises, at least one of freeing memory objects that are no longer in use, de-fragmenting one or more memory pools in the managed code environment, or compacting a portion of the memory used by the managed code environment.

23. The computer of claim 17, wherein the native code call further comprises, at least one of, a file system access, a network operation, an inter-process communication, a date/time function, a math function, a string processing function, a synchronization operation, or user interface function for the target platform.

24. A processor readable non-transitive storage media that includes instructions for managing memory for an application, wherein a computer that executes at least a portion of the instructions is enabled to perform actions, comprising:
  when at least one thread of a plurality of threads encounters a native code call during the execution of the application in a managed code environment, further actions are performed, including:
    determining at least one characteristic of the native code call based in part on configuration information that is associated with a target platform for the application;
    when the at least one characteristic of the native code call indicates that a duration of the native code call exceeds a defined duration threshold, updating at least state information for the at least one thread to at least indicate that the at least one thread is executing in an unmanaged code environment; and
    when the native code call completes, updating the state information for the at least one thread to at least indicate that the at least one thread is executing in the managed code environment; and
  when a garbage collection event occurs, further actions are performed, including:
    updating state information for each of the plurality of threads to communicate suspend request to the plurality of threads;
    waiting for each thread of the plurality of threads that is executing in the managed code environment to become safe for garbage collection; and
    when each thread in the managed code environment is safe for garbage collection, executing one or more garbage collection actions to manage the memory for the application.

25. The media of claim 24, further comprising, when the at least one characteristic of the native code call indicates that a duration of the native code call is less than a defined duration, executing the native code call, wherein the state information for the at least one thread is unmodified.

26. The media of claim 24, further comprising, when the at least one characteristic of the native code call indicates that the native code call reads or writes one or more managed memory objects, updating at least state information and garbage collection data for the at least one thread when the execution time of the native code call exceeds a defined duration.

27. The media of claim 24, wherein waiting for each thread of the plurality of threads that is executing in the managed code environment to become safe for garbage collection, further comprises, examining state information for each thread of the plurality of threads to determine if they are safe for garbage collection.

28. The media of claim 24, wherein determining the at least one characteristic of the native code call, further comprises, executing machine code that is automatically inserted into the application by a compiler, wherein the machine code enables the at least one characteristic of the native code call to be determined at runtime.

29. The media of claim 24, wherein executing one or more garbage collection actions, further comprises, at least one of freeing memory objects that are no longer in use, de-fragmenting one or more memory pools in the managed code environment, or compacting a portion of the memory used by the managed code environment.

30. The media of claim 24, further comprising, generating the garbage collection event based on at least one of, a memory consumption that exceeds a defined threshold, a timer expiration, or an activity level of the computer dropping below a defined threshold.

* * * * *

UNITED STATES PATENT AND TRADEMARK OFFICE
CERTIFICATE OF CORRECTION

| | |
|---|---|
| PATENT NO. | : 9,032,410 B1 |
| APPLICATION NO. | : 14/463440 |
| DATED | : May 12, 2015 |
| INVENTOR(S) | : Kumpera et al. |

It is certified that error appears in the above-identified patent and that said Letters Patent is hereby corrected as shown below:

In the specification

In Column 1, Line 33, delete "OF DRAWINGS" and insert -- OF THE DRAWINGS --, therefor.

In Column 2, Line 50, delete "and the include" and insert -- and "the" include --, therefor.

In Column 2, Line 54, delete "art the" and insert -- the art --, therefor.

In Column 3, Line 43, delete "resources or" and insert -- resources, or --, therefor.

In Column 3, Line 44, delete "environment.""" and insert -- environment," --, therefor.

In Column 4, Line 62, delete "threads ma suspend" and insert -- threads may suspend --, therefor.

In Column 6, Line 49, delete "the manacled" and insert -- the managed --, therefor.

In Column 7, Line 22, delete "However client" and insert -- However, client --, therefor.

In Column 8, Line 27, delete "networks, the" and insert -- networks, and the --, therefor.

In Column 8, Line 47, delete "(GSM). General" and insert -- (GSM), General --, therefor.

In Column 9, Line 38, delete "Moreover. Development" and insert -- Moreover, Development --, therefor.

In Column 10, Line 12, delete "(DMA," and insert -- CDMA, --, therefor.

In Column 10, Line 17, delete "protocol real-" and insert -- protocol/real- --, therefor.

Signed and Sealed this
Twenty-fourth Day of May, 2016

Michelle K. Lee
*Director of the United States Patent and Trademark Office*

CERTIFICATE OF CORRECTION (continued)
U.S. Pat. No. 9,032,410 B1

In Column 11, Line 31, delete "data Mass" and insert -- data. Mass --, therefor.

In Column 12, Line 46, delete "Protocol (VOW)" and insert -- Protocol (VOIP) --, therefor.

In Column 13, Line 32, delete "ROM." and insert -- ROM, --, therefor.

In Column 13, Line 39, delete "Memory 376 further" and insert -- Memory 326 further --, therefor.

In Column 15, Line 49, delete "506 in" and insert -- 506, in --, therefor.

In Column 15, Line 65, delete "monitoring," and insert -- monitoring --, therefor.

In Column 19, Line 28, delete "embodiments the" and insert -- embodiments, the --, therefor.

In Column 21, Line 21, delete "These type of" and insert -- These types of --, therefor.

In Column 22, Line 62, delete "their gc data" and insert -- their GC data --, therefor.

In Column 23, Line 3, delete "the gc data" and insert -- the GC data --, therefor.

In Column 24, Line 4, delete "of ever thread" and insert -- of every thread --, therefor.

In the claims

In Column 26, Line 46, in Claim 8, delete "threshold a" and insert -- threshold, a --, therefor.

In Column 27, Line 12, in Claim 9, delete "threads:" and insert -- threads; --, therefor.

In Column 27, Line 48, in Claim 13, delete "call further" and insert -- call, further --, therefor.

In Column 28, Line 59, in Claim 20, delete "said for" and insert -- safe for --, therefor.

In Column 28, Lines 61-62, in Claim 21, delete "comprises executing" and insert -- comprises, executing --, therefor.